(12) United States Patent
Taylor

(10) Patent No.: US 8,727,104 B2
(45) Date of Patent: May 20, 2014

(54) SLIP CONVEYOR

(75) Inventor: Alfred Alexander Taylor, Lugarno (AU)

(73) Assignee: TNA Australia Pty Limited, Lidcombe, New South Wales (AU)

( * ) Notice: Subject to any disclaimer, the term of this patent is extended or adjusted under 35 U.S.C. 154(b) by 112 days.

(21) Appl. No.: 13/506,211

(22) Filed: Apr. 4, 2012

(65) Prior Publication Data

US 2012/0261237 A1 Oct. 18, 2012

(30) Foreign Application Priority Data

Apr. 14, 2011 (AU) ................................ 2011901414

(51) Int. Cl.
*B65G 27/06* (2006.01)

(52) U.S. Cl.
USPC ......................................... 198/758; 198/753

(58) Field of Classification Search
USPC ........... 198/750.1, 750.14, 764, 369.2, 369.5, 198/369.1
See application file for complete search history.

(56) References Cited

U.S. PATENT DOCUMENTS

| 3,731,787 | A | 5/1973 | Gregor | |
|---|---|---|---|---|
| 7,185,754 | B2* | 3/2007 | Taylor et al. | 198/750.14 |
| 7,228,957 | B1* | 6/2007 | Taylor et al. | 198/753 |
| 2006/0090985 | A1* | 5/2006 | Taylor et al. | 198/758 |
| 2007/0108016 | A1 | 5/2007 | Eaton | |
| 2007/0131522 | A1* | 6/2007 | Taylor et al. | 198/753 |

FOREIGN PATENT DOCUMENTS

| EP | 0 593 234 A1 | 4/1994 |
|---|---|---|
| GB | 2 419 579 A | 5/2006 |
| JP | 2001-39527 A | 2/2001 |
| WO | 2008-103387 A1 | 8/2008 |

OTHER PUBLICATIONS

Great Britain Search Report mailed on Aug. 8, 2012 for GB Patent Application No. GB1206299.8, 3 pages.
First Examiner's Report for Spanish Application No. 201230558, Oct. 15, 2013, 6 pages.

* cited by examiner

*Primary Examiner* — James R Bidwell
(74) *Attorney, Agent, or Firm* — Kilpatrick Townsend & Stockton LLP

(57) ABSTRACT

A slip conveyor (10) having a plurality of trays (11, 12, 13). Each of the trays (11, 12, 13) has an end portion (19) with an edge (29) inclined to the longitudinal direction of movement (14) of the tray (11, 12, 13).

19 Claims, 4 Drawing Sheets

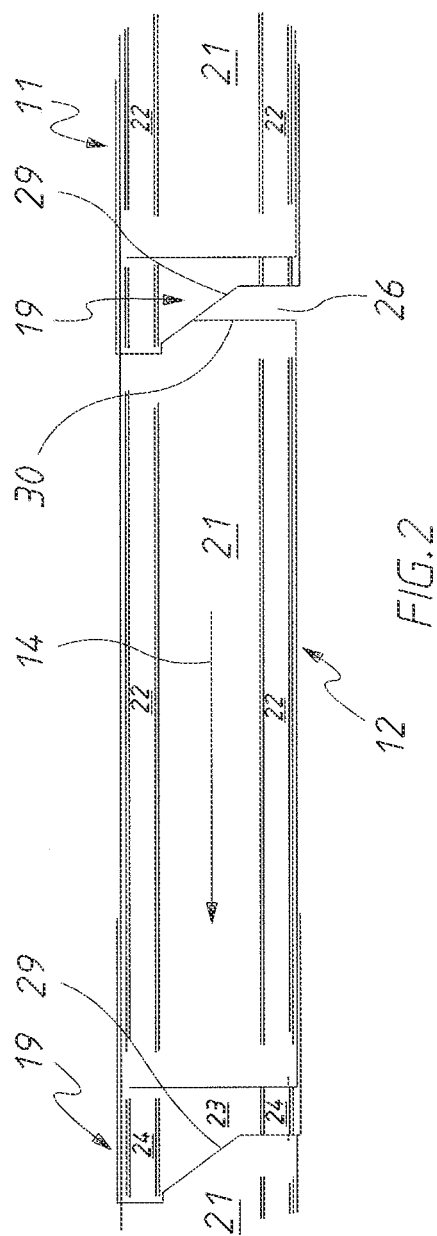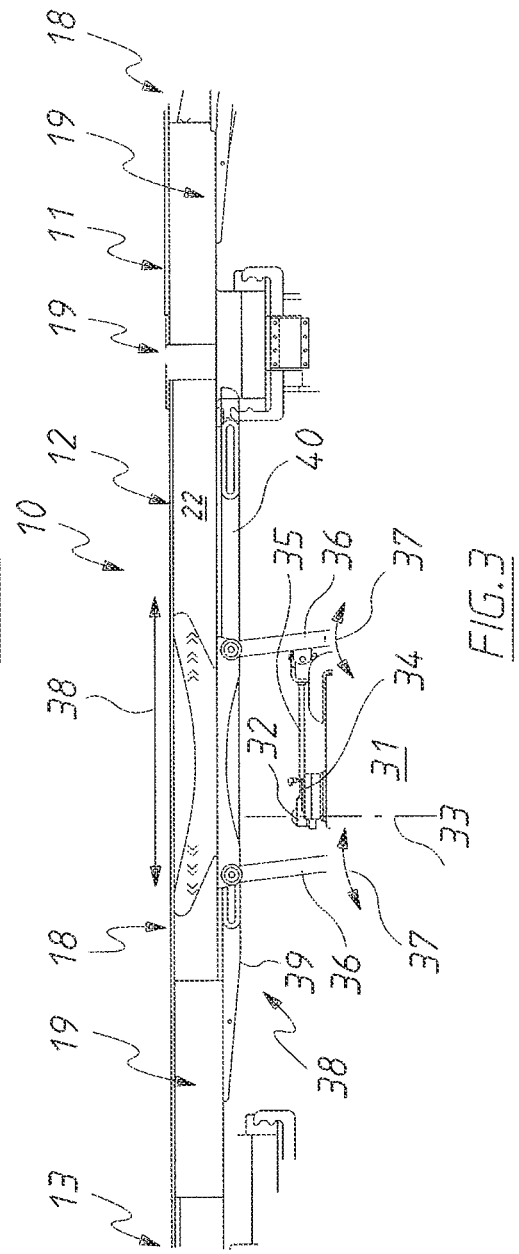

SLIP CONVEYOR

This application claims priority to Australian Application No. 2011901414, filed Apr. 14, 2011, the disclosure of which is incorporated by reference herein.

TECHNICAL FIELD

The present invention relates to slip conveyors and more particularly but not exclusively to slip conveyors employed in the packaging industry.

BACKGROUND OF THE INVENTION

Slip conveyors include longitudinally extending trays that are longitudinally vibrated (reciprocated) to transfer material along the conveyor. The longitudinal oscillation is rapid in one direction and slow in the other. The material is transported in the slow direction. Conveyors, including slip conveyors are described in U.S. Pat. No. 7,228,957 and U.S. patent application Ser. No. 11/108,052 (lodged on 14 Apr. 2005) and Ser. No. 11/263,762 (lodged on 31 Oct. 2205).

In the packaging industry, particularly the industry relating to the packaging of snack foods, product is delivered to a group of weighing machines, each of the weighing machines then communicates with an associated packaging machine such as the packaging machine described in U.S. Pat. No. 4,663,917. Conveyors, such as slip conveyors deliver the product to the weighing machines. A disadvantage of these known slip conveyors is that they cannot adapt to the varying demands of the different weighing and packaging machines.

OBJECT OF THE INVENTION

It is the object of the present invention to overcome or substantially ameliorate the above disadvantage.

SUMMARY OF THE INVENTION

There is disclosed herein a slip conveyor assembly including:
a first conveyor tray having a first longitudinal surface upon which product to be conveyed is supported;
a second conveyor tray, the second tray having a second longitudinally extending surface upon which the material to be conveyed is supported, with the second surface being positioned to receive the material from the first tray;
a drive assembly to cause longitudinal oscillation of each of the trays to convey the material in a predetermined direction; and wherein
the first conveyor tray includes an end portion located adjacent the second conveyor tray with the end portion being movable relative to the second tray to provide a longitudinally extending gap between the first and second trays via which product is delivered from the assembly, the gap having an area of a desired size and having a longitudinal length and a transverse width, with said width being adjustable by movement of said end portion relative to the second tray to thereby alter the size of said area.

Preferably, said first tray includes a longitudinally extending base with said end portion being operatively associated with the base for longitudinal movement relative thereto.

Preferably, said drive mechanism includes a first motor, the first motor causing longitudinal oscillation of said base and end portion, and a second motor to cause longitudinal relative movement between the end portion and the base.

Preferably, said base includes a longitudinally extending bottom wall providing the first surface, and a pair of longitudinally extending side walls, each side wall extending upwardly from the bottom wall so that the bottom wall is located therebetween, with said end portion being nested with respect to said base.

There is further disclosed herein a slip conveyor assembly including:
a first conveyor tray having a first longitudinally extending surface on which matter to be conveyed is supported;
a second conveyor tray, the second conveyor tray having a second longitudinally extending surface, with the longitudinal surfaces being located so that material is conveyed from the first surface to the second surface;
a drive mechanism operatively associated with both trays to cause longitudinal oscillation thereof to cause the material to be conveyed along the surfaces in a predetermined direction; and wherein
said first conveyor tray includes;
a longitudinally extending base,
a longitudinally extending end portion operatively associated with the base so as to be movable relative thereto, with the end portion being also movable relative to the second conveyor tray so as to be operable to provide a gap between the first and second trays via which product is delivered from the assembly.

Preferably, the end portion is moved longitudinally relative to the base to provide said gap.

Preferably, said base includes a longitudinally extending bottom wall and a pair of longitudinally extending side walls extending upwardly from the bottom wall so that the bottom wall is located therebetween, and said end portion is nested with respect to said base.

Preferably, said end portion has a longitudinally extending end portion bottom wall with a leading edge extending generally transverse of said direction.

Preferably, said leading edge is generally linear and extends at an acute angle relative to said direction.

Preferably, said drive mechanism includes a first motor, said first motor being operatively associated with both trays to cause said longitudinal oscillation, and said drive mechanism includes a second motor, said second motor being operatively associated with said base and said end portion to cause relative movement therebetween.

BRIEF DESCRIPTION OF THE DRAWINGS

A preferred form of the present invention will now be described by way of example with reference to the accompanying drawings wherein:

FIG. 2 is a schematic side elevation of the trays of the assembly of FIG. 1;

FIG. 3 is a schematic side elevation of portion of the assembly of FIG. 1;

DETAILED DESCRIPTION OF THE PREFERRED EMBODIMENT

Figure 1:
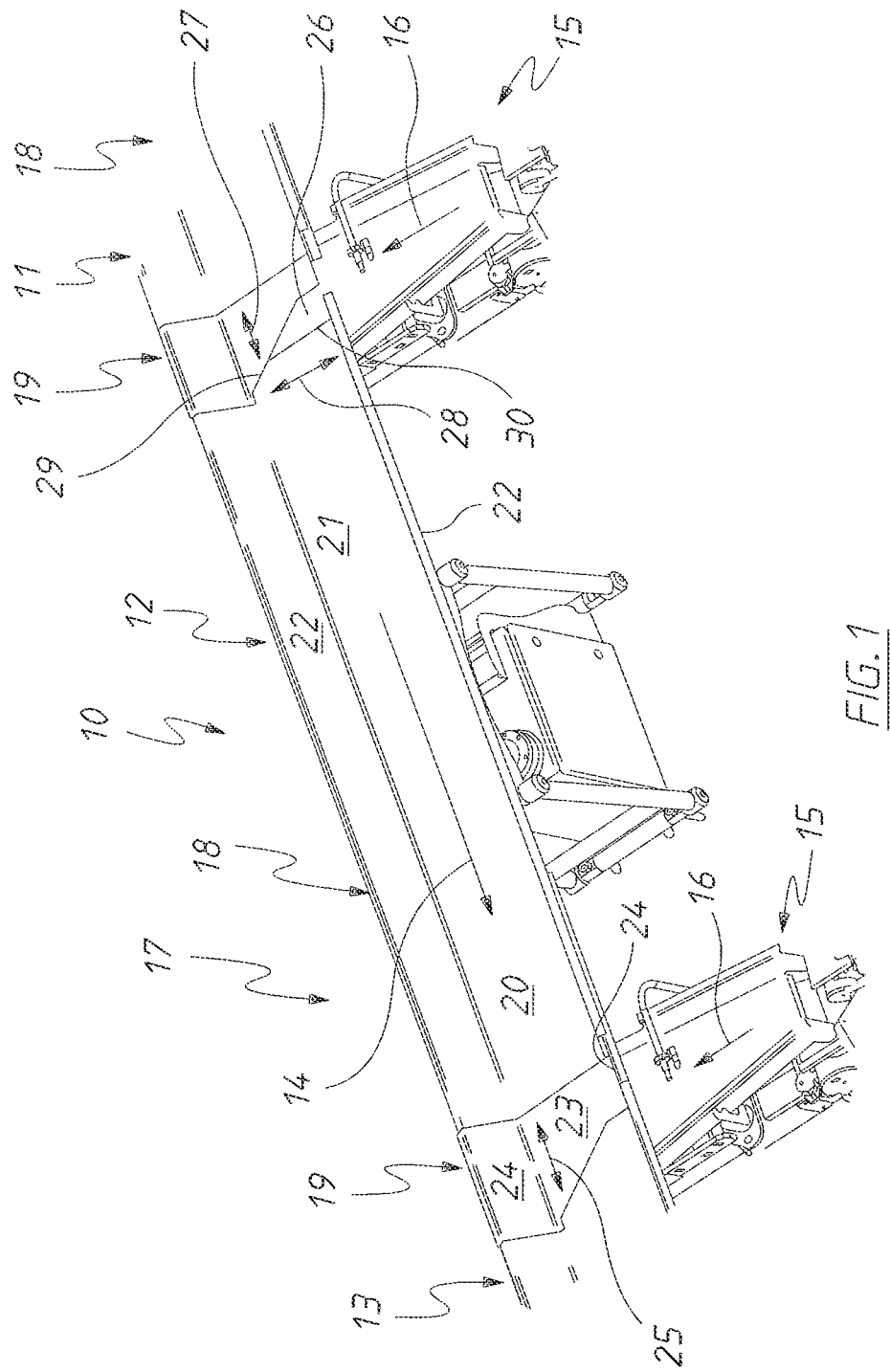
FIG. 1 is a schematic top isometric view of a slip conveyor assembly.
Figure 4:
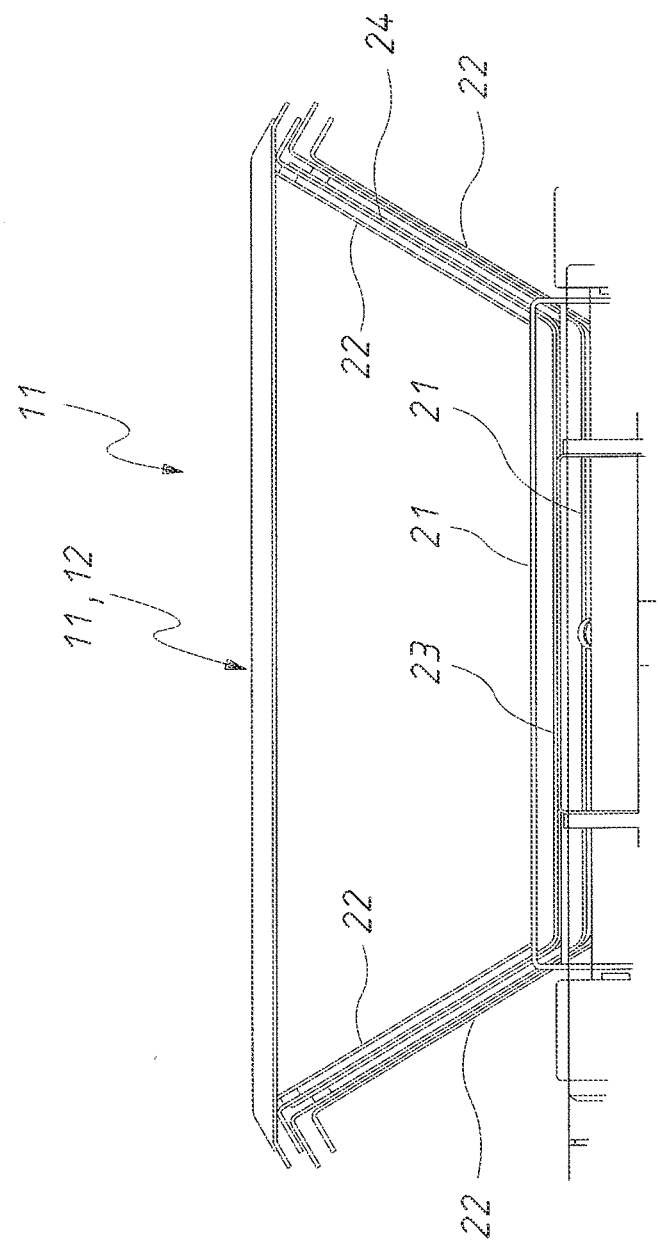
FIG. 4 is a schematic end elevation of portion of the trays of FIG. 2.
Figure 5:
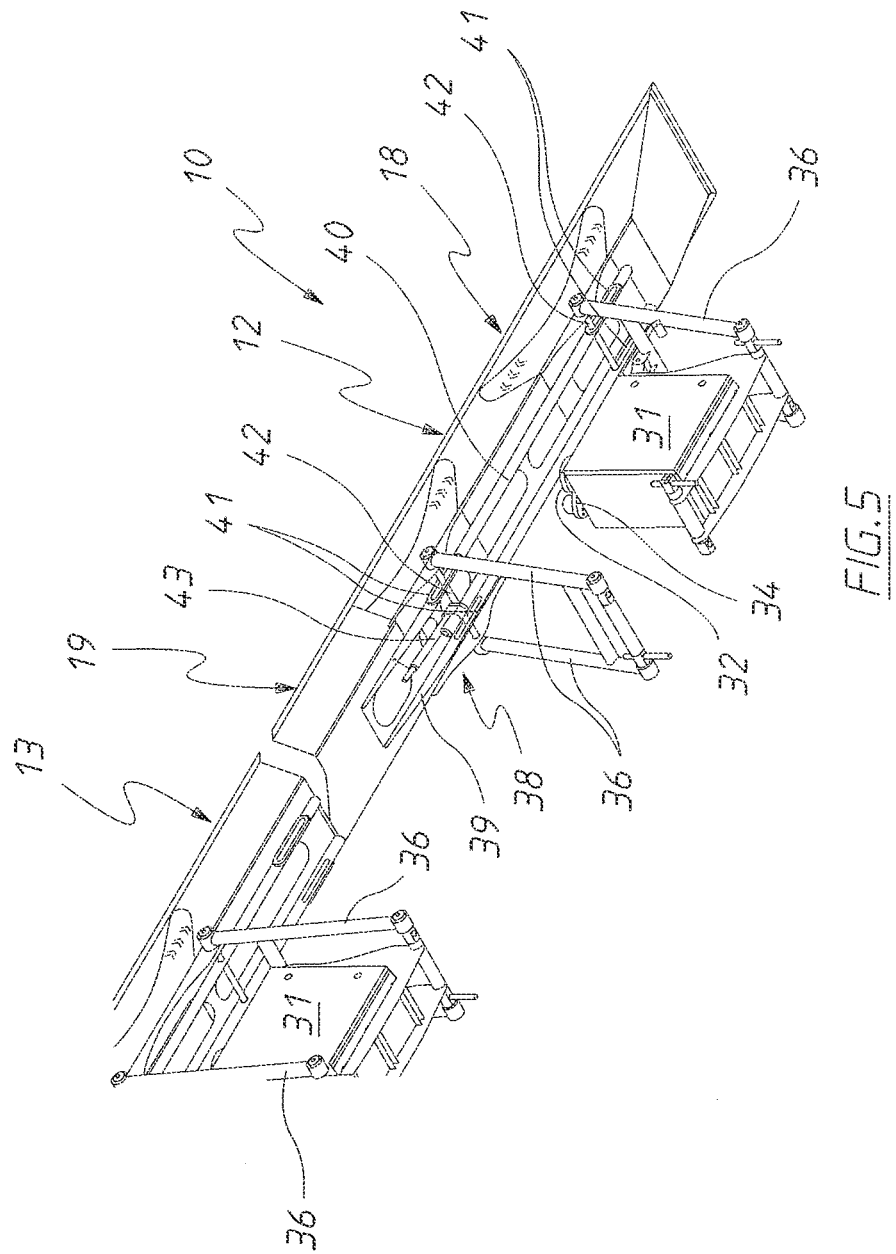
FIG. 5 is a schematic bottom isometric view of the assembly of FIG. 1.

In the accompanying drawings there is schematically depicted a slip conveyor assembly 10. The assembly 10 includes a plurality of conveyor trays 11, 12 and 13 that are operated to convey material in the direction 14. Located below the trays 11, 12 and 13 are transverse conveyors 15. Material being conveyed by the trays 11, 12 and 13 can be selectively delivered to the transverse conveyors 15 for delivery to packaging machines. The conveyors 15 transport conveyed material in the direction 16. The conveyors 15 may also be slip conveyors.

Each of the conveyors 11, 12 and 13 includes a longitudinally extending tray 17 that includes a base 18 and an end portion 19. The base 18 and end portion 19 provide a longitudinally extending surface 20 upon which the material rests to be conveyed in the direction 14.

The base 18 includes a longitudinally extending bottom wall 21 and a pair of upwardly extending side walls 22. The side walls 22 are attached to the bottom wall 21 and diverge upwardly therefrom so that the wall 21 is located between the walls 22.

The end portion 19 also includes a bottom wall 23 and upwardly extending and diverging side walls 24. The end portion 19 is of a very similar configuration to the base 18 so that the end portion 19 is nested below the base 18 but is in slidable contact therewith so that the end portion 19 is movable relative to the base 18 in the longitudinal direction 25. The direction 25 is parallel to the direction 14.

The end portion 19, by being movable relative to its associated base 18, is also movable relative to the next adjacent tray 11, 12 or 13. As the end portion 19 is movable relative to the next downstream tray 11, 12 or 13, the end portion 19 is movable to create a gap 26. The end portion 19 of the conveyor 12 is moved forward in the direction 14 so that there is no gap between the conveyor 12 and the conveyor 13. However the end portion 19 of the conveyor 11 is retracted relative to its associated base 18 so that there exists the gap 26. The gap 26 has an area with a longitudinal length 27 and a transverse width 28. By moving the end portion 19 relative to its associated base, the size of the area of the gap 26 is adjustable by changing the transverse width of the area of the gap 26.

In the above described preferred embodiment, each end portion 19 has a leading edge 29 that is inclined to the direction 14 by an acute angle. Preferably, the edge 29 is linear. The next adjacent bottom wall 21 has a trailing edge 30 that is normal to the direction 14. However it should be appreciate the gap 26 could also be created by the edge 30 being inclined by an acute angle to the direction 14, and the edge 29 being normal to the direction 14.

In the above described preferred embodiment, the end portion 19 is at the downstream end of its associated base 18. However the above assembly 10 could also be configured so that the end portion 19 is at the upstream end of the base 18.

The tray 12 is linearly oscillated (reciprocated) by means of a motor and control assembly 31. The motor and control assembly 31 includes a crank shaft 32 that is rotated about the generally upright axis 33. Extending from the shaft 32 is a crank arm 34 that is attached to a link 35. The link 35 is pivotally attached to one of a pair of generally parallel linkages 36 that are caused to angularly oscillate in the direction 37. The upper ends of the linkages 36 are pivotally attached to the tray 12 so that the tray 12 is caused to oscillate (reciprocate) in the direction 38.

Each end portion 19 is supported by means of a carriage 38, the carriage 38 including a carriage base 39 to which the end portion 19 is attached. Extending from the carriage base 39 is a longitudinally extending carriage mounting 40 that has eyelets 41 slidably engaging transverse shafts 42 attaching the linkages 36 to the tray 12. Extending between one of the shafts 42 and the carriage base 39 is a motor 43 that causes linear movement of the end portion 19 in the direction 38 relative to the base 18. As an example, the motor 43 may be a pneumatic cylinder or a linear drive mechanism including a power screw and associated driven nut.

The motor and control assembly 31 also drives the end portion 19 as the end portion 19 is attached to the base 18.

Each of the trays 11, 12 and 13 has its associated drive mechanism including the motor and control mechanism 31 and motor 43 to drive its associated end portion 19.

An advantage of the above described preferred embodiment is that by movement of the end portion 19 relative to its associated base 18 the size of the gap can be varied.

The invention claimed is:

1. A slip conveyor assembly comprising:
   a first conveyor tray comprising a first longitudinal surface upon which material to be conveyed is supported;
   a second conveyor tray, the second tray comprising a second longitudinally extending surface upon which the material to be conveyed is supported, with the second surface being positioned to receive the material from the first tray;
   a drive assembly to cause longitudinal oscillation of each of the trays to convey the material in a predetermined direction; and wherein
   the first conveyor tray comprises a longitudinally extending base, and an end portion located adjacent the second conveyor tray with the end portion being movable relative to the base and relative to the second tray to provide a longitudinally extending gap between the first and second trays via which product is delivered from the assembly, the gap having an area of a desired size and having a longitudinal length and a transverse width, with said width being adjustable by said movement of said end portion relative to the second tray to thereby alter the size of said area.

2. The assembly of claim 1, wherein said length of said gap is parallel to said longitudinal surfaces of said conveyor trays, wherein said width of said gap is perpendicular to said length and to said longitudinal surfaces of said conveyor trays, and wherein said movement is longitudinal movement in a direction substantially parallel to said length and to said longitudinal surfaces of said conveyor trays, wherein said movement comprises substantially no component in a direction parallel to said width of said gap.

3. The assembly of claim 1, wherein said drive mechanism comprises a first motor, the first motor causing longitudinal oscillation of said base and end portion, and a second motor to cause longitudinal relative movement between the end portion and the base.

4. The assembly of claim 1, wherein said base includes a longitudinally extending bottom wall providing the first surface, and a pair of longitudinally extending side walls, each side wall extending upwardly from the bottom wall so that the bottom wall is located therebetween, with said end portion being nested with respect to said base.

5. A slip conveyor assembly comprising:
   a first conveyor tray comprising a first longitudinally extending surface on which material to be conveyed is supported;
   a second conveyor tray, the second conveyor tray comprising a second longitudinally extending surface, with the longitudinal surfaces being located so that the material is conveyed from the first surface to the second surface;
   a drive mechanism operatively associated with both trays to cause longitudinal oscillation thereof to cause the material to be conveyed along the surfaces in a predetermined direction; and wherein
   said first conveyor tray comprises:

a longitudinally extending base; and a longitudinally extending end portion operatively associated with the base so as to be movable relative thereto, with the end portion being also movable relative to the second conveyor tray so as to be operable to provide a gap between the first and second trays via which product is delivered from the assembly.

6. The assembly of claim 5, wherein the end portion is moved longitudinally relative to the base to provide said gap.

7. The assembly of claim 5, wherein said base comprises a longitudinally extending bottom wall and a pair of longitudinally extending side walls extending upwardly from the bottom wall so that the bottom wall is located therebetween, and said end portion is nested with respect to said base.

8. The assembly of claim 5, wherein said end portion comprises a longitudinally extending end portion bottom wall comprising a leading edge extending generally transverse of said direction.

9. The assembly of claim 8, wherein said leading edge is generally linear and extends at an acute angle relative to said direction.

10. The assembly of claim 1, wherein said drive mechanism comprises a first motor, said first motor being operatively associated with both trays to cause said longitudinal oscillation, and said drive mechanism comprises a second motor, said second motor being operatively associated with said base and said end portion to cause relative movement therebetween.

11. The assembly of claim 3, wherein said base comprises a longitudinally extending bottom wall providing the first surface, and a pair of longitudinally extending side walls, each side wall extending upwardly from the bottom wall so that the bottom wall is located therebetween, with said end portion being nested with respect to said base.

12. The assembly of claim 6, wherein said base comprises a longitudinally extending bottom wall and a pair of longitudinally extending side walls extending upwardly from the bottom wall so that the bottom wall is located therebetween, and said end portion is nested with respect to said base.

13. The assembly of claim 6, wherein said end portion comprises a longitudinally extending end portion bottom wall with a leading edge extending generally transverse of said direction.

14. The assembly of claim 13, wherein said leading edge is generally linear and extends at an acute angle relative to said direction.

15. The assembly of claim 5, wherein said drive mechanism comprises a first motor, said first motor being operatively associated with both trays to cause said longitudinal oscillation, and said drive mechanism comprises a second motor, said second motor being operatively associated with said base and said end portion to cause relative movement therebetween.

16. The assembly of claim 7, wherein said end portion comprises a longitudinally extending end portion bottom wall with a leading edge extending generally transverse of said direction.

17. The assembly of claim 16, wherein said leading edge is generally linear and extends at an acute angle relative to said direction.

18. The assembly of claim 13, wherein said drive mechanism comprises a first motor, said first motor being operatively associated with both trays to cause said longitudinal oscillation, and said drive mechanism comprises a second motor, said second motor being operatively associated with said base and said end portion to cause relative movement therebetween.

19. The assembly of claim 17, wherein said drive mechanism comprises a first motor, said first motor being operatively associated with both trays to cause said longitudinal oscillation, and said drive mechanism comprises a second motor, said second motor being operatively associated with said base and said end portion to cause relative movement therebetween.

* * * * *